Feb. 7, 1933.  F. GIBSON  1,896,445
PUMP
Filed Aug. 24, 1931  2 Sheets-Sheet 1

Inventor
Fred Gibson
By Clarence A. O'Brien
Attorney

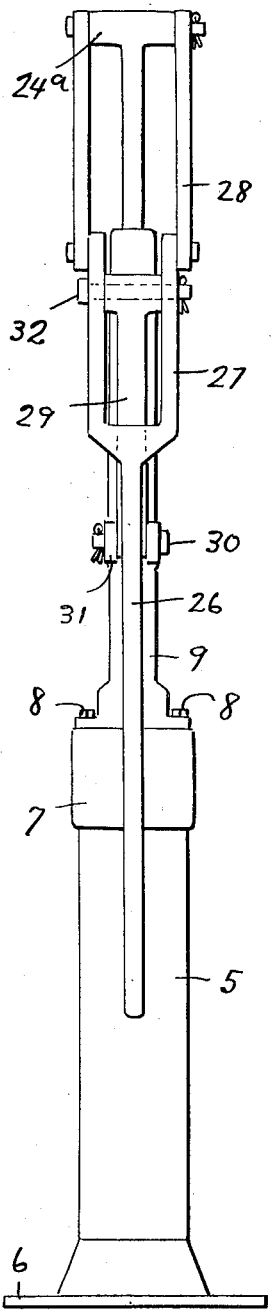

Patented Feb. 7, 1933

1,896,445

UNITED STATES PATENT OFFICE

FRED GIBSON, OF FRANKLIN, MINNESOTA

PUMP

Application filed August 24, 1931. Serial No. 559,058.

This invention relates to pumps, and the primary object of this invention is to provide certain new and useful improvements over the double acting force pump now in use.

A very important object of this invention is to provide a double acting force pump, consisting of a minimum number of parts, not likely to easily get out of order, and which will be capable of drawing a maximum amount of water with but a minimum amount of labor on the part of one operating the pump.

Other objects and advantages of the invention will be apparent from a study of the following description, taken in connection with the accompanying drawings wherein:

Figure 2 is an elevational view thereof.

Figure 1:
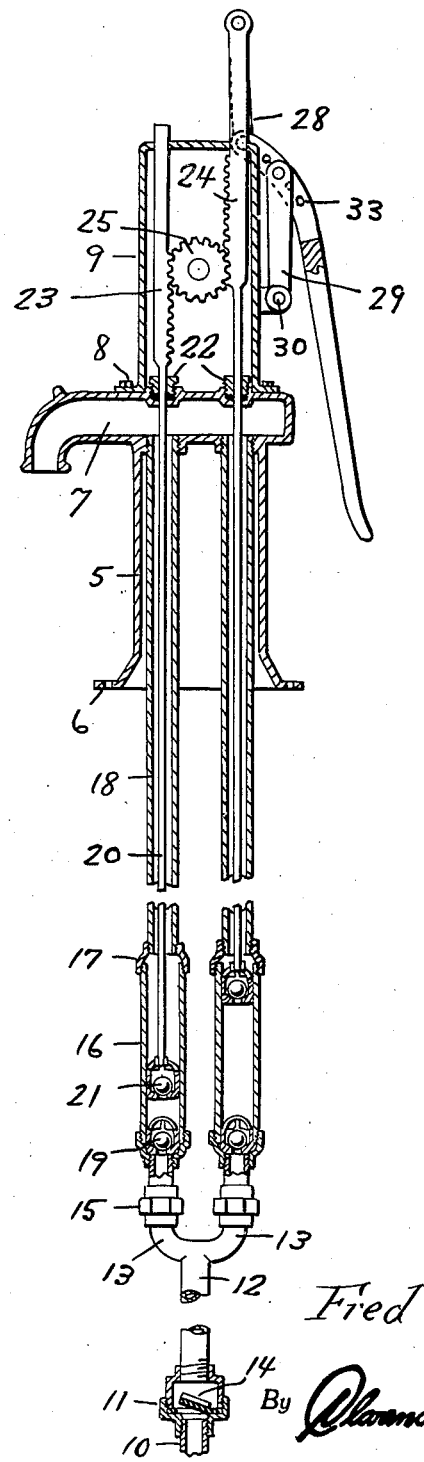
Figure 1 is a sectional elevational view taken through the improved pump.

Referring to the drawings, it will be seen that my improved pump comprises a pump casing 5 provided at its lower end with an apertured attaching flange 6 whereby the casing may be suitably anchored to a supporting surface. At its upper end the casing 5 is formed to provide a discharge spout 7. Secured to the top of the casing 5 as at 8 is a vertical gear casing 9.

10 designates a conventional supply pipe, and the same is coupled as at 11 with a distributor pipe 12 provided with branches 13. Provided in the couplings 11 is a flat valve 14.

To each branch 13 there is coupled through the medium of a union 15 one end of a cylinder 16. To the upper end of each cylinder 16 there is coupled as at 17 a pipe 18 which in turn is coupled at its upper end to the bottom portion of the pump spout 7.

Arranged in the lower end of each cylinder 16 is a suitable and conventional ball check valve 19.

Operable in each of the pipes 18 is a plunger rod 20 that is provided at its lower end with a valved piston or plunger 21 operable for reciprocatory movement within one cylinder 16. The rods 20 are operable in suitable gland structures 22 provided in the top of the spout 7, and one of the rods 20 at its upper end is provided with a rack bar 23 while the other of said bars is provided with a rack bar 24.

The upper ends of the rack bars 23, 24 extend through the top of the casing 9, and the teeth of said rack bars are in mesh with a gear wheel 25 suitably journalled within the casing 9.

An actuating handle 26 is provided for the pump, and said handle at one end is provided with a fork 27, the ends of which are pivotally connected to the cross head 24a of the rack bar 24 through the medium of links 28. To provide a fulcrum for the handle 26, there is provided a link 29 that at one end is pivoted as at 30 between a pair of spaced opposed ears 31 projecting laterally from the gear casing 9. The other end of the link 29 is suitably formed to fit between the opposed portions of the fork 27 and is operatively connected with the fork 27 through the medium of a pivot pin 32 that extends through an aperture provided in the last referred to end of the link 29, and a pair of opposed apertures 33 provided on the fork 27 and with which the apertured end of the link 29 is alined. To provide for an adjustable pivotal connection between link 29 and fork 27, the fork 27 is provided with a plurality of such pairs of opposed apertures 33. (See Figure 1).

In operation, the pump handle 26 is worked up and down in a manner thought apparent thus transmitting reciprocatory movement to the rack bar 24, which in turn through the medium of the gear wheel 25 transmits similar movement to the rack bar 23. Thus it will be apparent that as one of the pistons 21 moves downwardly in its cylinder 16, the other of the pistons will move upwardly in its cylinder.

As each piston 21 moves upwardly in its cylinder, the valve 19 of that particular cylinder will be moved to an open position, and suction is created through the branch 13 and pipe 12 whereby water is drawn from the pipe 10 through valve 14, pipe 12, branch 13 and into that particular cylinder. Upon downward movement of the piston in its cylinder, the valve 19 of that particular cylinder will be moved to a closed position and the water drawn into that particular cylinder will then be forced upwardly through the pipe 18 and discharged through the spout 7.

Thus it will be apparent, that as one cylinder 16 is being filled with water, the other cylinder is having the water pumped therefrom and discharged through the spout 17. As will also be apparent from a study of Figure 1, when one of the pistons is at the limit of its upward movement, the other of the pistons is at the limit of its downward movement, the valve 14 will be closed thus preventing the water being forced from the filled cylinder back through the pipe 12, and it is also obvious the water in pipe 12 will be retained therein so as to be drawn therefrom during the upward movement of the other piston.

Even though I have herein shown and described the preferred embodiment of the invention, it is to be understood that the same is susceptible of changes, modifications and improvements coming within the scope of the appended claim.

Having thus described my invention, what I claim as new is:

A pump of the class described comprising a vertically arranged casing having a supporting flange at its lower end and having a horizontal chamber at its upper end formed with an extension at one end thereof projecting outwardly from the casing to form a discharge spout, a pair of pipes having their upper portions passing through the casing with their upper ends connected with and in communication with the chamber, a cylinder on the lower end of each pipe, a forked pipe having the limbs of its fork connected to the bottoms of the cylinders, a valve casing connected to the lower end of the stem of the forked pipe and containing an upwardly opening valve, a supply pipe connected to the lower end of the valve casing, a piston containing an upwardly opening valve in each cylinder, rods connected to the pistons and passing through the first-mentioned pipes and through the chamber with racks on the upper ends of said rods, a housing supported on the top of the horizontal chamber and through which the upper ends of the piston rods pass, said housing having openings in its top thru which the upper ends of the piston rods pass, packing means for the rods in the upper wall of the chamber and located in the housing, a gear supported in said housing between the rods and meshing with the racks thereof, a handle connected with the upper end of one of the rods and upwardly opening check valves at the lower ends of the cylinders.

In testimony whereof I affix my signature.

FRED GIBSON.